United States Patent [19]
Schmitz, Jr.

[11] Patent Number: 5,816,743
[45] Date of Patent: *Oct. 6, 1998

[54] APPARATUS FOR CONTAINING RUN-OFF PRODUCED AFTER WASHING VEHICLES AND THE LIKE

[76] Inventor: John W. Schmitz, Jr., 382 Prince Frederick St., King of Prussia, Pa. 19406

[ * ] Notice: The term of this patent shall not extend beyond the expiration date of Pat. No. 5,547,312.

[21] Appl. No.: 699,967

[22] Filed: Aug. 20, 1996

Related U.S. Application Data

[63] Continuation of Ser. No. 231,322, Apr. 22, 1994, Pat. No. 5,547,312.

[51] Int. Cl.⁶ ..................................................... F16N 31/00
[52] U.S. Cl. .............................. 405/53; 137/312; 220/573
[58] Field of Search ...................... 137/312; 141/311 A; 184/106; 220/573; 405/52, 53; 588/249, 250

[56] References Cited

U.S. PATENT DOCUMENTS

| | | | |
|---|---|---|---|
| 463,964 | 11/1891 | Gates | 220/9.1 |
| 935,278 | 9/1909 | Smyth | 220/641 |
| 2,483,789 | 10/1949 | Smith et al. | 4/506 |
| 2,839,762 | 6/1958 | Nomura | 4/488 |
| 3,026,539 | 3/1962 | Lewis | 4/587 |
| 3,799,228 | 3/1974 | Crawford | 150/49 |
| 3,856,064 | 12/1974 | Swalleri | 150/49 |
| 4,114,644 | 9/1978 | Piper | 137/565 |
| 4,201,307 | 5/1980 | Malloy | 220/62 |
| 4,246,982 | 1/1981 | Pretnick | 184/106 |
| 4,278,115 | 7/1981 | Briles et al. | 141/86 |
| 4,651,887 | 3/1987 | Patrick | 220/571 |
| 4,671,024 | 6/1987 | Schumacher | 52/2 |
| 4,727,904 | 3/1988 | Lease | 137/565 |
| 4,765,775 | 8/1988 | Kroger | 405/52 |
| 4,775,067 | 10/1988 | Mount | 220/573 |
| 4,941,551 | 7/1990 | Visser | 184/106 |
| 4,987,973 | 1/1991 | Cody | 184/1.5 |
| 5,090,588 | 2/1992 | Van Romer et al. | 220/573 |
| 5,099,872 | 3/1992 | Tarvin et al. | 137/312 |
| 5,232,308 | 8/1993 | Verstraeten | 405/53 |
| 5,246,044 | 9/1993 | Robertson et al. | 141/86 |
| 5,301,722 | 4/1994 | Todd et al. | 141/86 |
| 5,316,175 | 5/1994 | Van Romer | 220/573 |
| 5,547,312 | 8/1996 | Schmitz | 405/52 |

FOREIGN PATENT DOCUMENTS 12374  7/1992  WIPO .

OTHER PUBLICATIONS

Two (2) page advertisement of Polystar Inc., for a spill containment system.

*Primary Examiner*—John A. Ricci
*Attorney, Agent, or Firm*—Mark A. Garzia

[57] ABSTRACT

A portable containment apparatus for field use in containing liquids from vehicles and the like. The containment apparatus is especially designed to contain wash water run-off and includes a plurality of side members for defining a predetermined wash area, an integral floor and wall for containing the wash off, a sump for collecting the wash off, a sump pump for removing the liquid from the containment area to a remote container for later disposal.

18 Claims, 6 Drawing Sheets

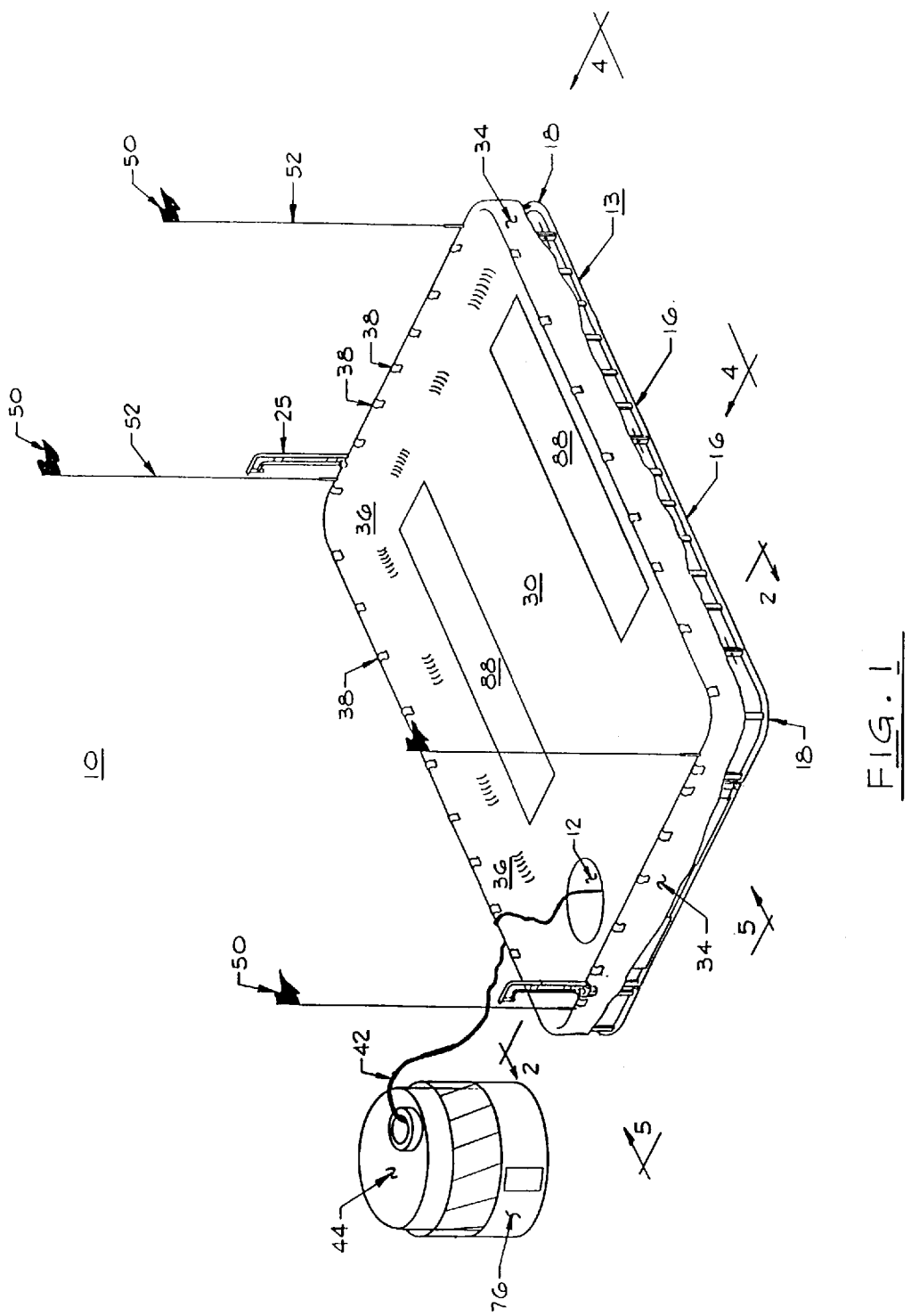

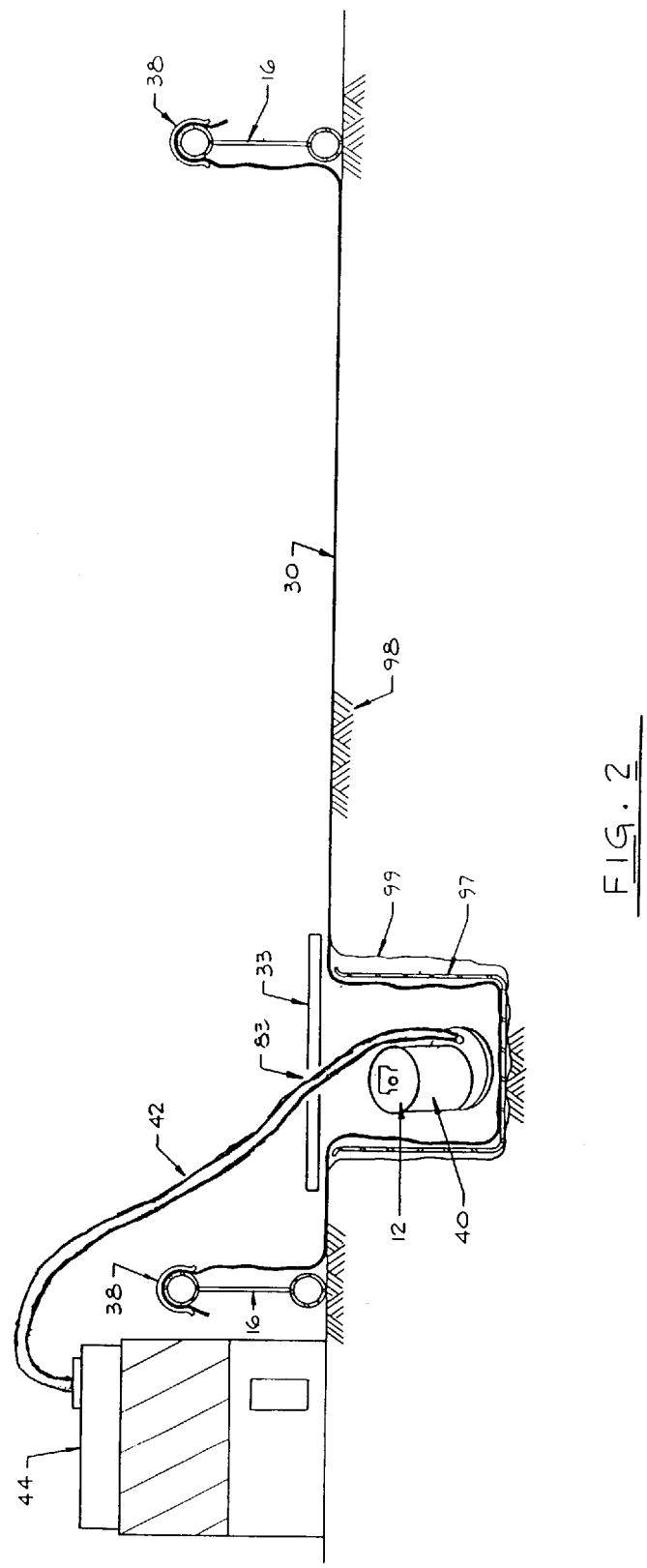

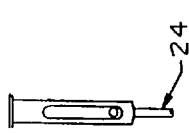
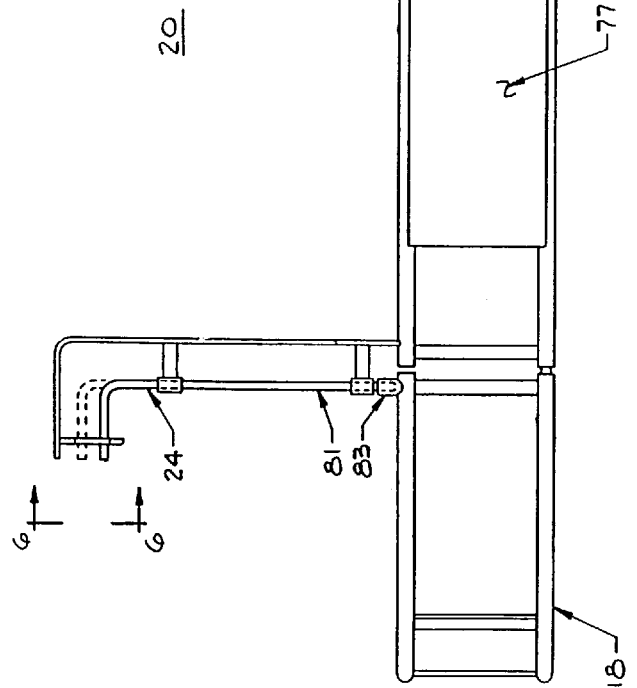

APPARATUS FOR CONTAINING RUN-OFF PRODUCED AFTER WASHING VEHICLES AND THE LIKE

This is a continuation of application Ser. No. 08/2331,322 filed on Apr. 22, 1994, now U.S. Pat. No. 5,547,312, issued on Aug. 20, 1996.

BACKGROUND OF THE INVENTION

The daily use of automobiles, vans, trucks, construction equipment, factory equipment and the like results in the accumulation of foreign materials including dirt, debris and chemical residues. The foreign material collects on the tires, wheel wells, bodies and the undercarriages of the vehicles. The accumulation of these foreign materials detract from the appearance of the vehicles. In addition, as in the case of road tar and salt used during the winter to melt ice, it may effect the integrity of the vehicle's components, e.g. wheel imbalance, rust and corrosion. The operation of large pieces of factory equipment may also be impeded by dirt and excess material which accumulates under normal conditions.

Businesses employing a large number of commercial vehicles strive to keep these vehicles clean since it is believed that the appearance of the vehicles projects the image of the business. In addition, the corrosion caused by chemical reactions between the vehicle's metal parts and some foreign materials will increase maintenance costs and may detract from the safety of the vehicle. Accordingly, businesses wash the vehicles on a regular basis.

Because of recent legislation which limits run-off from private property, businesses are finding it impractical to wash the vehicles as an in-house function. This is especially true when the business depends on a large fleet of vehicles. If the regulations are violated, the non-complying company and it's officers may be subject to punitive actions.

Permanent structures, have been constructed to house washing apparatus and to contain the contaminants washed off from commercial vehicles. There are several drawbacks with these permanent structures. First, the costs may be prohibitive. This is especially true for small businesses. Second, the structure is not easily adaptable for different sized vehicles. For example, a permanent structure may not be able to accommodate very wide or very long vehicles. Finally, a large corporation may store their vehicles at multiple locations. It is not feasible to bring a large number of vehicles to one central location for cleaning. If the vehicles are in transit to a remote location for cleaning, they cannot be used for their intended purposes.

Temporary containment systems have been developed for containing liquid spills. However, these systems are usually designed to collect run-off from under only a portion of a vehicle and are not designed to contain large quantities of liquid.

SUMMARY OF THE INVENTION

An object of the present invention is to provide an improved apparatus for containing the water and debris washed off from vehicles and the like.

The present invention includes self-standing side or support members and a floor made from sheet material. This sheet material may be large enough to form the walls of the containment basin, providing a contiguous medium. The side members are easily assembled and disassembled. The side members are situated in a predetermined location. The floor is preferably laid inside of the support members. Also, it is preferred that the floor is flexible so that the periphery of the floor can be bent upwards and draped over the support members. The portion of the floor section which is bent upwards substantially forms a wall which will prevent the dirty water from running off of the land and into streams, sewer systems and storm drains. The portion of the floor which is draped over the support member may be secured with fasteners, including clips or tie downs, to keep the floor section in place.

An area underneath a portion of the floor section is dug out and is used as a sump. The integrity of the floor may be preserved by designing the sheet material to substantially follow the outline of the sump area. A preexisting hole may be used as the sump area. In this case, a specially designed adapter may be inserted into the hole and the contoured sump area of the floor is positioned over the hole. The sump is designed to collect the run-off water after the vehicles are washed. A pump is inserted into the sump to transport the run-off into a nearby container or water recycling system.

BRIEF DESCRIPTION OF THE DRAWINGS

These and other objects of the present invention and the various features and details of the operation and construction thereof are hereinafter more fully set forth with reference to the accompanying drawings, where:

FIG. 1 is a perspective view of the present invention;

FIG. 2 is a side elevation sectional view of the present invention taken along line 2—2 of FIG. 1 showing the sump area;

FIG. 5 is side elevation view of the gate taken along line 5—5 of FIG. 1 shown without the sheet material attached;

FIG. 6 is a partial side elevation view of the gate handle taken along line 6—6 of FIG. 5;

DETAILED DESCRIPTION OF THE PREFERRED EMBODIMENT

Figure 3A:
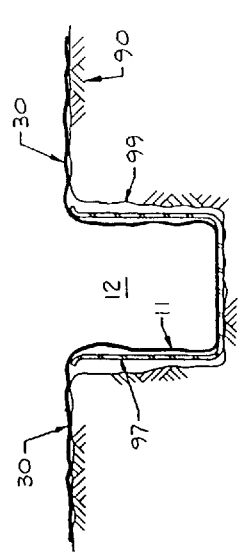
FIGS. 3a and 3b are partial side elevation sectional views of two sump options.

Referring now to the drawings, a portable containment system and apparatus in accordance with the present invention, is designated generally as 10. FIG. 1 shows the preferred embodiment of the portable containment apparatus.

A location is chosen to situate the apparatus 10. A sump 12 is required. Referring now to FIG. 2, the sump 12 may be a hole 99 dug in the ground or pavement 98 prior to the assembly of the portable containment system 10. An insert 97 may be used to define the sump area 12. For example, a typical five gallon bucket may be inserted into the hole 99. The bucket is then inserted into the sump 12. If the hole 99 is too large an adapter means (not shown) may be used to secure the bucket 97.

A cover 33 may be used to prevent the people washing the vehicles from accidentally falling into the sump 12. Also it may be desirable in some circumstances to have the cover 33 support the weight of a vehicle. The cover 33 includes openings 83 to allow the wash-off to enter and to allow a hose 42 to pass through.

Figure 3B:
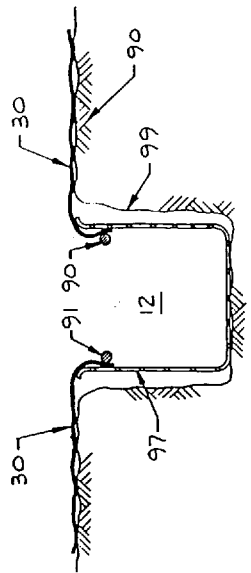

Turning now to FIGS. 3a and 3b, two options regarding the sump area are shown. In FIG. 3a, the bucket 97 is placed inside of the hole 99. A floor 30, described later, may be manufactured to form a contiguous boundary 11 within the sump 12. FIG. 3 discloses that the floor 30 may be manufactured with an open area, thereby leaving flaps 90 which partially overlap the bucket 97. A snap ring 91 may be used to secure the flaps 90 to bucket 97. The sump option shown in FIG. 3b is useful when the pavement 98 is pitched or uneven. It also eliminates the need to customize each unit.

Referring again to FIG. 1, a rectangular frame 13 made of self-supporting side members is then assembled. The sump 12 is situated inside the frame 13 formed by the side members. There are generally two different side members, namely straight sections 16 and corner sections 18. In the preferred embodiment, the support members 16, 18 are made of steel, however other common building materials may be used including plastic (PVC), wood, aluminum, etc. The type of material used to construct the frame impacts on the weight, and therefore the portability, of the containment system 10.

Figure 4:
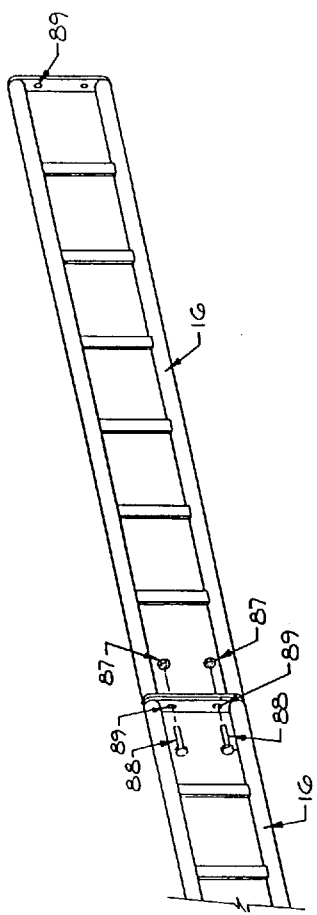
FIG. 4 is a partial side elevation view of the side members taken along line 4—4 of FIG. 1 shown without the sheet material attached.

The ends of each side member 16, 18 are designed to connect together usually by having alternate male and female mating ends or ends which can be bolted together. A nut and bolt arrangement is disclosed in FIG. 4. The ends of each straight section 16 are abutted. Bolt holes 89 are aligned and bolts 88 are inserted. The side members are secured by tightening nuts 87.

The straight sections 16 may be of any length. The number and length of the straight sections 16 depend on the type of vehicles to be washed, the size of the structure used to store the disassembled containment apparatus, and the type of material (steel, aluminum, etc.) used to construct the sections.

The corner sections 18 are preferably 90°. This aids in the preferred design of a substantially rectangularly-shaped containment area. However, it should be clear that the general shape the containment system 10 is not limited to a rectangle. In fact, the shape is dictated by space requirements, vehicle configuration, and personal taste or preference.

Figure 7:
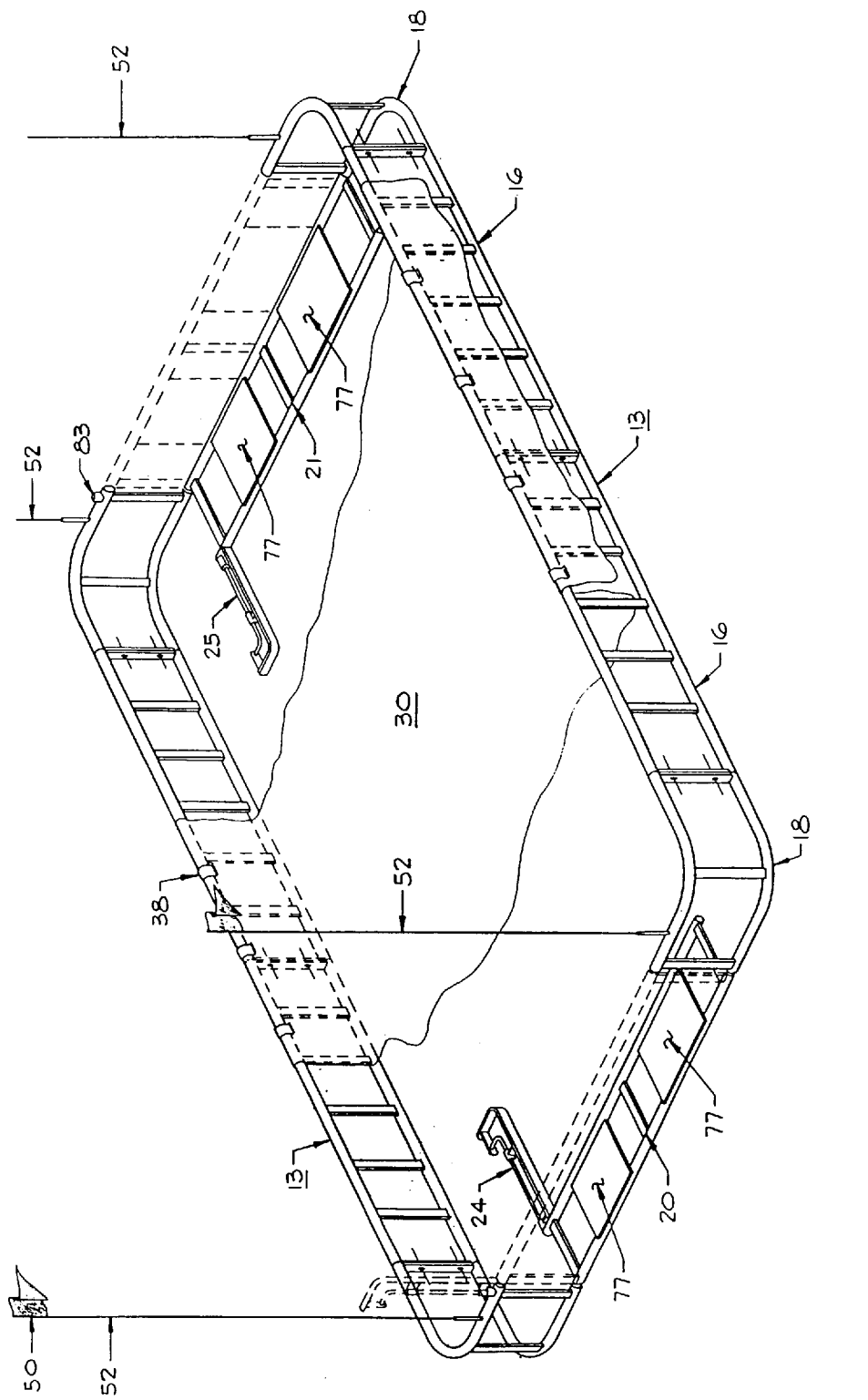
FIG. 7 is a perspective view of the present invention with the sheet material shown in partial cut-away, showing the range of movement of the gates.
Figure 8:
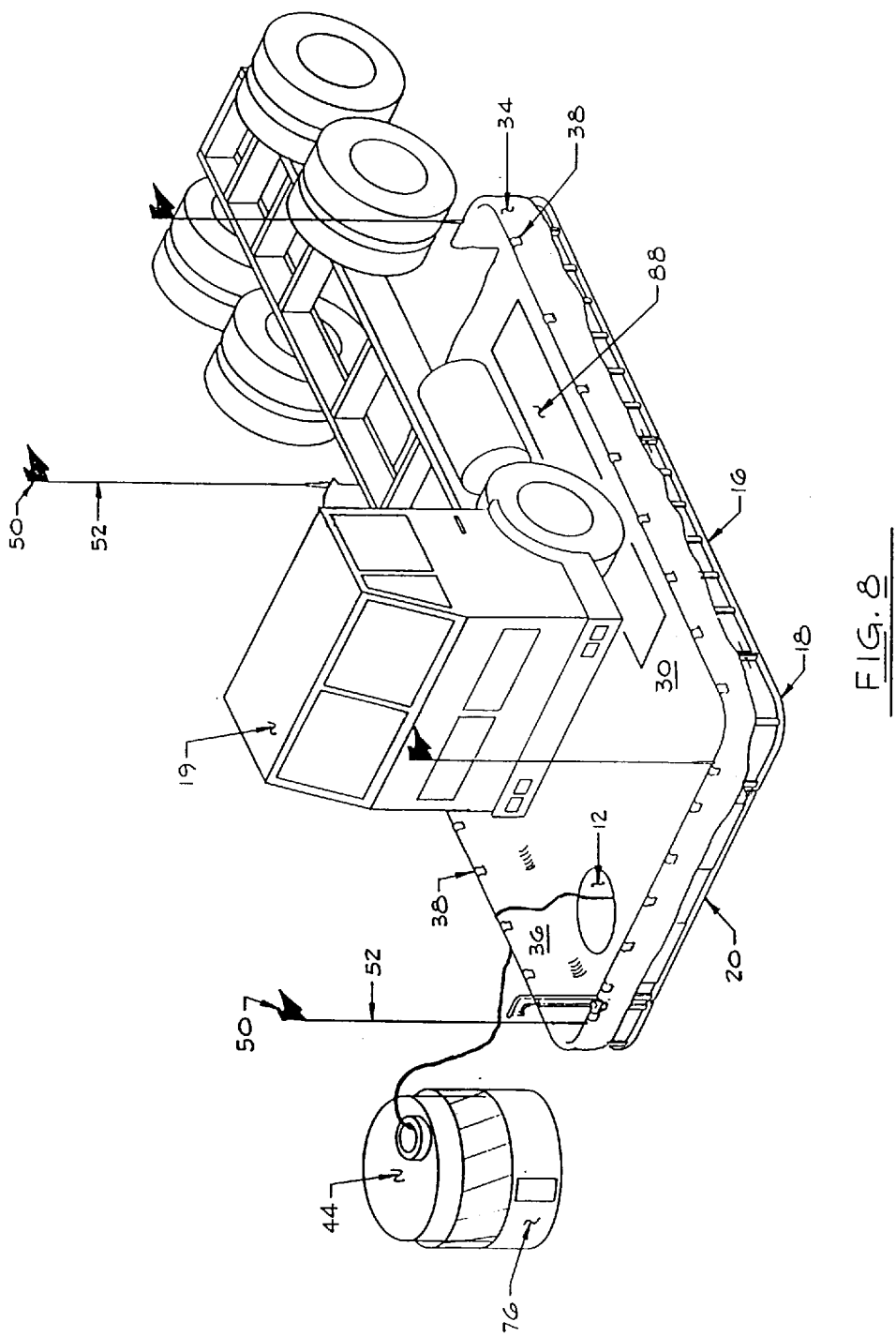
FIG. 8 is a perspective view of a truck driving into the containment apparatus of the present invention.

The frame 13 includes at least one gate section 20. The gate section 20 may be a removable section, or a hinged section which can rotate between a substantially vertical position to a substantially horizontal position. The gate 20 is secured in a substantially vertical position when the containment system is being used. As shown in FIGS. 5, 7 and 8, the gate section 20 is removed or collapsed to allow a vehicle 19 to enter into the interior of the frame 13 or to leave the interior area. The gate 20 may include a locking mechanism 24, shown in detail in FIGS. 5 and 6, to secure the gate portion 20 in a substantially vertical orientation when the gate is in a vertical position, remote end 81 is inserted into a tubular section 83 on the frame. The locking mechanism 24 is raised to disengage its end 81 from the tubular section 83.

In a preferred embodiment, the frame 13 includes two gates 20, 21, each gate having its respective locking mechanism 24, 25. Two gates allow quicker access to and egress from the floor 30. This is an advantage when many vehicles must be washed.

Reinforcing sections 77 strengthen the gate 20, since the wheels of each vehicle continuously roll over them. The reinforcing sections 77 also ease the movement of the vehicles over the frame's threshold.

The frame 13 may be assembled around the sump 12. Alternatively, the frame 13 may be assembled at a remote location, carried as one piece and located with the sump 12 in its interior.

After the frame or support structure 13 is in place, a pliable sheet material is positioned in the interior of the frame 13, forming the floor 30 of the containment apparatus 10. The flaps 90 or the contiguous boundary 11 are positioned over the sump 12. In the preferred embodiment, the sheet material is large enough to form the walls of the containment area. As can be seen in FIGS. 1, 7 and 8, the periphery area 34 of the floor 30 is directed upwards and draped over the side-members 16, 18. The periphery area 34 is secured to the side-members 16, 18 by clips 38 or other common attachment means. The clips 38 prevent the floor 30 from moving or slipping. The frame 13 supports the upturned floor ends 34 and form a wall 36 for containing the wash-off from the vehicles. (The-wash off includes the water used to wash the vehicle and any foreign material removed from the vehicle.)

The floor 30 is made of a liquid impervious material and is preferably chemically resistant. In the preferred embodiment, the floor 30 is made of a rubber based material. Runners 68 may be placed over the floor 30, and positioned substantially in accordance with the wheel base of the vehicle being washed to prevent wear and tear of the floor 30, thereby increasing the life span of the floor 30.

Referring again to FIG. 2, a pump 40 is inserted in the sump 12. The pump 40 transports the wash-off which accumulates in the sump 12 to a remote location. The pump 40 may be a standard sump pump used in basements and other areas which are susceptible to flooding. If the business owns a large number of vehicles and/or if the vehicles are operated in exceptionally dirty areas, an industrial or commercial quality pump may be needed.

The sump pump 40 must be sized to pump out as many gallons of water per minute as is used by the hoses bringing in the clean water to wash the vehicles. For example, if there are two hoses used to wash off the vehicle 19 and each hose allows five gallons of water per minute to enter into the containment area, the sump pump 40 must pump out at least ten gallons per minute.

A connecting hose 42 carries the dirty water or wash-off from the sump pump 40 to a container 44. The container 44 is preferably large enough to hold all of the water needed to wash several vehicles. The preferred embodiment uses a 1,500 gallon tank and is periodically evacuated. In an alternate embodiment, the hose 42 may be connected to a water recycling or treatment center.

A fence or guard 76 may be placed around the container 44 to protect it from punctures and bumping by the vehicles. The immediate area around the containment system 10 is a high traffic area since vehicles are constantly leaving and entering.

Referring to FIGS. 7 and 8, the lock mechanism 25 is released allowing the gate section 21 to collapse or lay substantially flat. A vehicle 19 is then driven over the frame threshold and onto the floor 30, i.e. the interior of the frame 13. Ramps or risers 77 may be attached to the outer side of the gate section 20 to facilitate the movement of the vehicle across the threshold.

The gate section 21 is moved to its vertical position. The vehicle 19 is then washed. The clean water removes the debris and chemical residues from the vehicle 19. This run-off pools in sump 12. Pump 40 moves the run-off from the sump 12 to the container 44 for storage.

After the vehicle 19 has been washed, the gates 20 and 21 are opened, and the clean vehicle drives out of the interior of the containment apparatus 10, while a dirty vehicle drives in. If the container 44 is full, it must be evacuated so that the wash-off from a new vehicle may then be stored.

An indicator means may be used to relay the location of the gates to the vehicle's driver. In the preferred embodiment, flags 50 attached to flexible poles 52 are located proximate each side of gates 20, 21. This will allow the driver to avoid hitting or driving over the frame 13.

It should be noted that the present containment system 10 has been described as containing wash water run-off. However, the system 10 is easily adaptable to contain other liquids in an emergency or for the regular maintenance of the vehicles. For example, if a vehicle is leaking fuel, the floor 30 must be impervious to diesel fuel or gasoline. Also, a different type of pump may be needed.

Even though particular embodiments of the present invention have been illustrated and described herein, it is not intended to limit the invention. It is understood that modification and variation of the present invention may be made without departing from the spirit or scope of the following claims.

What is claimed is:

1. An apparatus for containing liquids, comprising:
   a plurality of self-standing side members, releasably connected in a predetermined manner to form an independent frame that defines an interior containment area;
   a sump located within the interior containment area; and
   a liquid-impermeable pliable sheet, situated within the containment area, that is draped over the side members and communicates with the side members for defining a floor and walls of the apparatus,
   the sheet extending into the sump and forming a contiguous boundary with the floor for collecting liquid.

2. The apparatus of claim 1, further comprising:
   a sump pump, situated in the sump, for transporting the liquid;
   a container located proximate the pump for storing the liquids; and
   a hose for carrying the liquids from the pump to the container.

3. The apparatus of claim 2 further comprising a cover for the sump, the cover including entry means for the hose and liquids.

4. The apparatus of claim 1 further comprising clips for releasably securing the walls to the side members.

5. The apparatus of claim 1 wherein the side members are designed to assemble and disassemble thereby making the apparatus portable.

6. The apparatus of claim 5 wherein said side members are reconfigurable to define respective interior containment areas having various dimensions, said sheet being sized so that it can be situated within the variously-dimensioned interior containment areas.

7. The apparatus of claim 1 wherein the sheet is made of a chemically resistant fabric.

8. The apparatus of claim 1 further comprising a plurality of runners positioned on the floor and separated by a distance substantially equal to the wheel base of a vehicle to be driven onto the floor, for preventing the wear of the floor as the vehicles move over the floor.

9. The apparatus of claim 1 further comprising a gate that communicates with said side members for facilitating entry onto and egress from the floor.

10. The apparatus of claim 9 further comprising visual means attached to the side members to indicate the location of the gate.

11. The apparatus of claim 10 wherein the visual means are flags attached to flexible poles.

12. The apparatus of claim 11 further comprising a second gate, further facilitating entry onto and egress from the floor.

13. The apparatus of claim 12 further comprising locking mechanisms on each gate to secure the gates in a substantially vertical position.

14. The apparatus of claim 1 wherein said side members comprise straight sections and corner sections.

15. A portable containment apparatus, comprising:
   a plurality of interconnectable side members, wherein the side members may be connected in various configurations to form an independent, self-standing frame that defines an interior containment area of adjustable dimensions; and
   a liquid-impermeable sheet situated within the interior containment area and is supported by and releasably attached to the side members to define a floor and walls.

16. The apparatus of claim 15, further comprising a sump that cooperates with the liquid-impermeable sheet for collecting liquids that may accumulate on said floor.

17. The apparatus of claim 16, further comprising a gate integrated into any side member for facilitating entry onto an egress from the container.

18. The apparatus of claim 17 wherein said side members comprise straight sections and corner sections.

* * * * *